H. R. ROBBINS.
Tobacco Pipe.
No. 77,096.             Patented April 21, 1868.
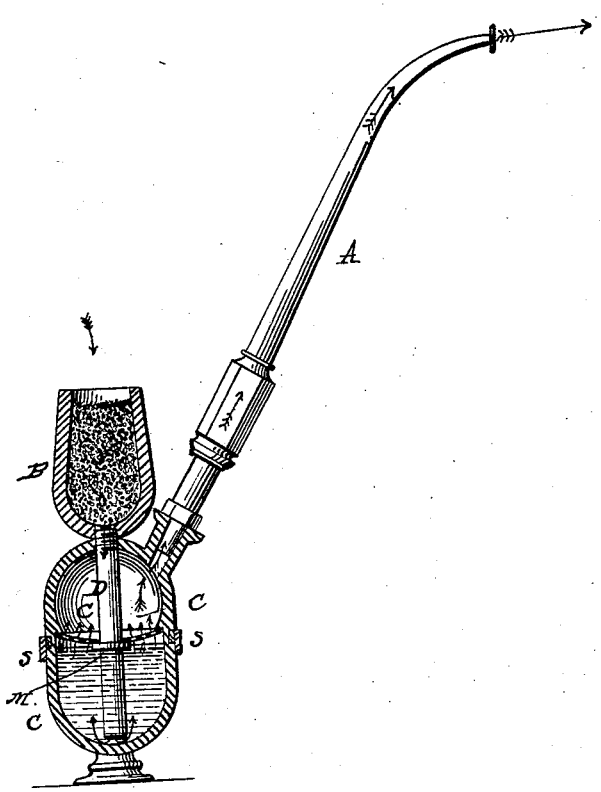

United States Patent Office.

HENRY R. ROBBINS, OF BALTIMORE, MARYLAND, ASSIGNOR TO HIMSELF AND W. H. GREEN, OF SAME PLACE.

Letters Patent No. 77,096, dated April 21, 1868.

TOBACCO-PIPE.

*The Schedule referred to in these Letters Patent and making part of the same.*

TO ALL WHOM IT MAY CONCERN:

Be it known that I, HENRY R. ROBBINS, of the city and county of Baltimore, and State of Maryland, have invented a new and improved Tobacco-Smoking Pipe; and I do hereby declare that the following is a full, clear, and exact description of the same, reference being had to the annexed drawing, making a part of this specification, in which—

My invention is represented by a vertical section.

In this invention, the pipe, which is so small that it can readily be carried in the pocket, is provided with an improved apparatus for passing the smoke through water, and for preventing the water from escaping into the stem or the bowl, and is so constructed that it can be readily taken apart for cleansing it.

In the drawings, A represents the stem, B the bowl, and C a hollow glass vessel, of the form shown in the drawing. Across the centre of the vessel C is a foraminated metallic diaphragm or screen $c$, the perforations of which are very minute, being of a size that will allow air, smoke, &c., to pass through them slowly under light pressure, but will not readily allow water to pass, except when impelled by a considerable degree of force. A tube, D, passes from near the bottom of the chamber within the vessel C up through the screen $c$, and through the roof of the vessel C, screwing into the bottom of the tobacco-bowl. It may be provided, both for ornament and convenience in screwing or unscrewing it, with a milled nut, $n$, below the screen $c$, and it may be screwed to or through the screen, so as to attach the tube-screen and bowl together.

The smoke from the bowl B is drawn through the tube D to the bottom of the chamber C, where it escapes into water, with which the latter is filled nearly up to the screen, and then rises in bubbles and passes through the perforations of the screen into the smoke-chamber in the upper part of the vessel C, whence it is drawn into the stem A.

If the pipe should be tipped over carelessly, or by any accident shaken so as to agitate the water below the screen, the latter will prevent the water from escaping from its proper place in the vessel. It will also, during the process of smoking, cause the smoke to rise through the water equally all around the central tube, and thus subject it more completely to the action of the liquids within the chamber.

The bowl B may be unscrewed and removed, and the vessel C may be formed of two parts screwed together by an air-tight joint, $s\ s$, by means of which the lower part or water-chamber may be unscrewed and removed. When this has been done, the screen $c$ and tube D may be taken out, and the stem A removed, and every part of the apparatus can be readily and perfectly washed and cleansed.

Having thus described my invention, what I claim as new, and desire to secure by Letters Patent, is—

In a smoking-pipe composed of the stem A, bowl B, tube D, and vessel C, I claim the minutely-foraminated screen $c$, operating in connection with the tube D and vessel C, substantially as and for the purpose specified.

To the above specification of my improvement, I have signed my hand, this 26th day of February, 1868.

HENRY R. ROBBINS.

Witnesses:
C. A. PETTIT,
SOLON C. KEMON.